US007065526B2

(12) United States Patent
Wissner et al.

(10) Patent No.: US 7,065,526 B2
(45) Date of Patent: Jun. 20, 2006

(54) SCALABLE DATABASE MANAGEMENT SYSTEM

(75) Inventors: Michael J. Wissner, Belmont, MA (US); James C. Salem, Acton, MA (US); Arden L. Rodgers, Arlington, MA (US)

(73) Assignee: Intuit, Inc., Mountain View, CA (US)

( * ) Notice: Subject to any disclaimer, the term of this patent is extended or adjusted under 35 U.S.C. 154(b) by 292 days.

(21) Appl. No.: 10/081,525

(22) Filed: Feb. 21, 2002

(65) Prior Publication Data

US 2003/0158847 A1    Aug. 21, 2003

(51) Int. Cl.
*G06F 17/30*    (2006.01)
*G06F 7/00*    (2006.01)
(52) U.S. Cl. ......................................................... 707/10
(58) Field of Classification Search ................. 707/1.5, 707/10
See application file for complete search history.

(56) References Cited

U.S. PATENT DOCUMENTS

| | | | | |
|---|---|---|---|---|
| 5,287,461 A | * | 2/1994 | Moore ......................... | 709/219 |
| 5,341,477 A | * | 8/1994 | Pitkin et al. ................. | 709/226 |
| 5,452,450 A | * | 9/1995 | Delory ........................ | 707/10 |
| 5,483,652 A | * | 1/1996 | Sudama et al. .............. | 707/10 |
| 5,606,693 A | * | 2/1997 | Nilsen et al. ................ | 707/10 |
| 5,668,986 A | * | 9/1997 | Nilsen et al. ................ | 707/10 |
| 5,701,451 A | * | 12/1997 | Rogers et al. ................ | 707/1 |
| 5,740,423 A | | 4/1998 | Logan et al. | |
| 5,793,964 A | * | 8/1998 | Rogers et al. ............... | 709/202 |
| 5,826,270 A | * | 10/1998 | Rutkowski et al. ........... | 707/10 |
| 5,835,712 A | | 11/1998 | DuFresne .............. | 395/200.33 |
| 5,915,249 A | | 6/1999 | Spencer | |
| 5,974,441 A | | 10/1999 | Rogers et al. .............. | 709/200 |
| 5,978,577 A | * | 11/1999 | Rierden et al. ................ | 707/10 |
| 5,999,941 A | | 12/1999 | Andersen ..................... | 707/103 |
| 6,023,708 A | | 2/2000 | Mendez et al. ............. | 707/203 |
| 6,038,566 A | | 3/2000 | Tsai ........................... | 707/102 |
| 6,041,344 A | * | 3/2000 | Bodamer et al. ........... | 709/203 |
| 6,055,541 A | | 4/2000 | Solecki et al. .............. | 707/103 |
| 6,094,649 A | | 7/2000 | Bowen et al. ................. | 707/3 |
| 6,125,369 A | * | 9/2000 | Wu et al. .................... | 707/201 |
| 6,128,619 A | | 10/2000 | Fogarasi et al. ............ | 707/102 |
| 6,128,624 A | | 10/2000 | Papierniak et al. ......... | 707/104 |
| 6,131,096 A | | 10/2000 | Ng et al. ....................... | 707/10 |
| 6,131,116 A | | 10/2000 | Riggins et al. ............. | 709/219 |
| 6,134,549 A | | 10/2000 | Regnier et al. ................ | 707/9 |

(Continued)

OTHER PUBLICATIONS

DeWitt, D. and J. Grat "Parallel Database Systems: The Future of High Performance Database Systems", Communications of the ACM, vol. 35, No. 6, pp. 85-98, Jun. 1992.*

(Continued)

*Primary Examiner*—Luke S Wassum
(74) *Attorney, Agent, or Firm*—Fenwick & West LLP

(57) ABSTRACT

A database management system is disclosed. One example provides request handler modules through which users interface with the database management system. A master control module assigns database servers to databases. A request handler module receives a database request from a client and sends a database identifier to the master control module, which determines an assigned database server and returns its location to the request handler module. The request handler module then sends the database request to the assigned database server, which handles the database request. The database management system facilitates the addition of database servers without requiring substantial system reconfiguration. It also facilitates migration of database assignments for improved efficiency or other reasons.

42 Claims, 9 Drawing Sheets

U.S. PATENT DOCUMENTS

| | | | |
|---|---|---|---|
| 6,141,759 A * | 10/2000 | Braddy | 713/201 |
| 6,151,606 A | 11/2000 | Mendez | 707/201 |
| 6,199,110 B1 * | 3/2001 | Rizvi et al. | 709/227 |
| 6,226,649 B1 * | 5/2001 | Bodamer et al. | 707/104.1 |
| 6,256,621 B1 | 7/2001 | Tsuchida et al. | |
| 6,266,673 B1 * | 7/2001 | Hong et al. | 707/103 R |
| 6,292,802 B1 | 9/2001 | Kessenich et al. | |
| 6,298,451 B1 * | 10/2001 | Lin | 714/4 |
| 6,304,967 B1 * | 10/2001 | Braddy | 713/150 |
| 6,415,323 B1 * | 7/2002 | McCanne et al. | 709/225 |
| 6,446,218 B1 * | 9/2002 | D'Souza | 714/4 |
| 6,453,468 B1 * | 9/2002 | D'Souza | 717/168 |
| 6,601,101 B1 * | 7/2003 | Lee et al. | 709/227 |
| 6,604,135 B1 * | 8/2003 | Rogers et al. | 709/217 |
| 6,738,773 B1 * | 5/2004 | Reunert et al. | 707/10 |
| 6,826,613 B1 * | 11/2004 | Wang et al. | 709/227 |
| 6,950,848 B1 * | 9/2005 | Yousefi'zadeh | 709/203 |
| 2001/0051975 A1 * | 12/2001 | Ohtani et al. | 709/202 |
| 2004/0148366 A1 * | 7/2004 | Ross et al. | 709/218 |

OTHER PUBLICATIONS

Sheldon, M.A., A. Duda, R. Weiss and D.K. Gifford "Discover: A Resource Discovery System Based on Content Routing", Proceedings of the 3rd World Wide Web Conference, 1995.*

French, J.C., A.L. Powell and W.R. Creighton, III "Efficient Searching in Distributed Digital Libraries", Proceedings of the 3rd ACM Conference on Digital Libraries, pp. 283-284, May 1998.*

French, J.C., A.L. Powell, C.L. Viles, T. Emmitt and K.J. Prey "Evaluating Database Selection Techniques: A Testbed and Experiment", Proceedings of the 21st Annual International ACM SIGIR Conference, pp. 121-129, Aug. 1998.*

Karaul, M., Y.A. Korilis and A. Orda "A Market-Based Architecture for Management of Geographically Dispersed, Replicated Web Servers", Proceedings of the 1st International Conference on Information and Computation Economies (ICE 98), pp. 158-165, Oct. 1998.*

Vaidya, G. "Intuit Unveils Web-Based Database Tool", PCWorld, Dec. 11, 2000, downloaded from www.pcworld.com.*

BusinessWire "Intuit Unveils Web-Based Tool for Sharing Information", Dec. 11, 2000.*

Hogan, M. "A Quick Study: Intuit's New QuickBase Service", PCWorld, Mar. 2001 issue, published Feb. 1, 2001, downloaded from www.pcworld.com.*

Wildstrom, S.H. "Online Software Finally Gets Useful", BusinessWeek Online, Feb. 5, 2001, downloaded from www.businessweek.com.*

Muse, D. "QuickBase Goes Corporate", Internet News, Apr. 8, 2002, downloaded from www.internetnews.com.*

Intuit "QuickBase in the News", downloaded from www.quickbase.com, Apr. 29, 2005.*

Cheng, Gang, "A Web and Parallel RDBMS-Based Information System for Internet Collaboration," original date of publication unknown, 13 pages [accessed Feb. 20, 2002, printed Jun. 12, 2002]. Retrieved from the Internet: <URL: http://www.npac.syr.edu/users/gcheng/homepage/thesis/node94.html>.

Graven, Matthew P., "Online PIMs," pp. 1-4, dated Aug. 1, 2000, PC Magazine (online). Retrieved from the Internet: <URL:http://www.pcmag.com/print_article/0,3048,6=6047,00.asp>.

Correla, Edward J., " Westside Story: Ex-Microsoft Visionaries Create Hosted IDE," pp. 1-2, dated Nov. 15, 2001, SD Times (online). Retrieved from the Internet <URL: http://www.sdtimes.com/news/042/story2.htm>.

Butner, Richard, "Use the Web to Build a 'Web'," pp. 1-8, dated May 22, 2001, PC Magazine (online). Retrieved from the Internet <URL: http://www.pcmag.com/article2/0,4149,8614,00.asp>.

Randall, Neil, "Take Advantage of Online Databases," pp. 1-8, dated Mar. 20, 2001, PC Magazine (online). Retrieved from the Internet <URL: http://www.pcmag.com/article2/0,4149,351,00.asp>.

"Bitlocker Launches Web Service for Publishing Databases," Information Today, vol. 17, No. 3, Mar. 2000, one page. Retrieved from the Internet <URL: http://www.infotoday.com/it/mar00/news16.htm>.

* cited by examiner

SCALABLE DATABASE MANAGEMENT SYSTEM

BACKGROUND OF THE INVENTION

1. Field of the Invention

This invention relates generally to database systems, and more particularly to a scalable, network-based database system.

2. Description of the Related Art

Conventional database systems now provide Internet interfaces that allow multiple users to access databases through the Internet. Particularly, a first registered user accesses and modifies values in a database through their web browser. A second registered user similarly accesses the database through their browser. This allows the different users to access the database from separate locales through a regular network (e.g., Internet) connection.

An example of a conventional database system implements a web server that interfaces with web clients, and an application server that receives and sequentially processes received database requests by accessing a back end relational database server. There are several problems with this architecture. One is that the sequential processing of database requests allows a single time consuming or problematic database request to delay the processing of subsequent requests that could have been easily handled. Particularly in systems where many different groups of users access many separate databases, the application server becomes a significant processing bottleneck.

Another problem with these systems is that a majority of the database users may commonly reside in a particular location relative to the application server. Inefficiencies arise when numerous remote users access large amounts of data traversing many network segments.

Still another problem with these systems is that it is difficult to increase capacity. Merely adding application servers would not solve the problems of these systems. Indeed, such may create additional problems, as this merely pushes back the bottleneck to a router which must distribute requests across multiple application servers, and may also require a lock server to manage concurrent access.

Thus, there remains a need for a database system that handles database requests more efficiently, removes bottlenecks associated with conventional systems, facilitates system growth without sacrificing database integrity or efficiency, and allocates database servers to efficiently serve their clients.

SUMMARY OF THE INVENTION

The present invention allows the management of numerous databases that are accessed by users from various remote locations, allows capacity to be increased in a scalable fashion, manages and allocates database requests and failures more efficiently, and facilitates migration of database assignments.

In one aspect, the present invention provides a number of web based request handler modules (RHM) through which clients interface with the database management system. These request handler modules communicate with a master control module (MCM) that manages the assignment of numerous database application modules (DBAM) to databases. Each DBAM can communicate with a file server or the like that persistently stores the databases managed by the system, in centralized or decentralized fashion. The DBAM can then load assigned databases from the file server, for handling requests, and can unload databases when their assignment terminates.

When an RHM receives a database request from a client, it sends identifying information for the relevant database to the MCM. The MCM determines an assigned DBAM for the database, and returns location information for the assigned DBAM to the RHM. The RHM uses this location information to connect with and send the database request to the assigned DBAM for handling. The assigned DBAM handles the database request and returns its results to the RHM for provision to the client.

These features facilitate deployment of multiple web based request handlers that interface with various users dispersed throughout a network, such as the Internet. The web based request handlers do not need to be modified and need not be concerned about the introduction of additional database servers to handle increasing system loads, as the master control module maintains the association of databases to database servers. Further, by identifying databases and mapping them to DBAMs by the MCM, the system prevents request handlers from sending database requests to the incorrect database server, and prevents multiple request handlers from concurrently requesting separate database servers to perform database operations on the same database, retaining database integrity.

In one embodiment, the MCM maintains a mapping of unique database identifiers to currently assigned DBAMs. When the RHM receives a database request from a client, it extracts the database identifier from the request and sends it to the MCM, which examines the mapping to locate the currently assigned DBAM for that identifier and thus the database corresponding to the identifier. The mapping may be variously implemented but in one example the database identifiers are mapped to the IP address and port number corresponding to the currently assigned DBAM. This information is returned to the RHM, which uses it to send the database request to the appropriate DBAM. The DBAM may already own the database and have it loaded upon receipt of the request from the RHM. The DBAM can also communicate with the file server to load the database corresponding to the DBID. The database can be accessed by file name, and a shared storage can list the association of file names to DBIDs.

Requests from the clients to create databases are also fulfilled. In one example, the RHM receives such a request and identifies the desired action to the MCM, which generates a new DBID, assigns an available DBAM to the request, and gives the DBAM location information to the RHM. The RHM (or MCM) can then use the location information to send the request to create a new database to the DBAM, which creates the new database (e.g., by receiving user input that defines the fields in the database, or by copying a database template, etc.). The DBAM then retains the created database in memory to handle database requests. The new DBID can then be used to appropriately direct future database requests for the created database to the assigned DBAM.

The MCM can also assign databases to alternative DBAMs, for any number of reasons. In one example, improved failure recovery is provided, as the MCM coherently and efficiently reassigns a database to an alternative DBAM when a currently assigned DBAM fails or is non-responsive. This is accomplished by retaining a list of available DBAMs, terminating the assignment of a database to a current DBAM, identifying an alternative DBAM from the list, sending the location information for the alternative DBAM to the RHM, and updating the mapping to reflect the new database assignment. If the currently assigned DBAM had the database loaded, it would preferably unload the database to the file server for loading by the alternative DBAM, although alternatives involving direct transfers of databases could also be provided.

Another aspect of the present invention migrates database assignments based upon usage information or other criteria. For example, where the master control module determines a primary usage location (e.g., where a substantial number of the client devices using a particular database reside in a particular local area network, network segment, geographical location or the like), the master control module reassigns the particular database to an available database server that is located closer to the primary usage location.

The present invention has embodiments in various methods for receiving, routing and handling client requests, system architectures, software modules, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
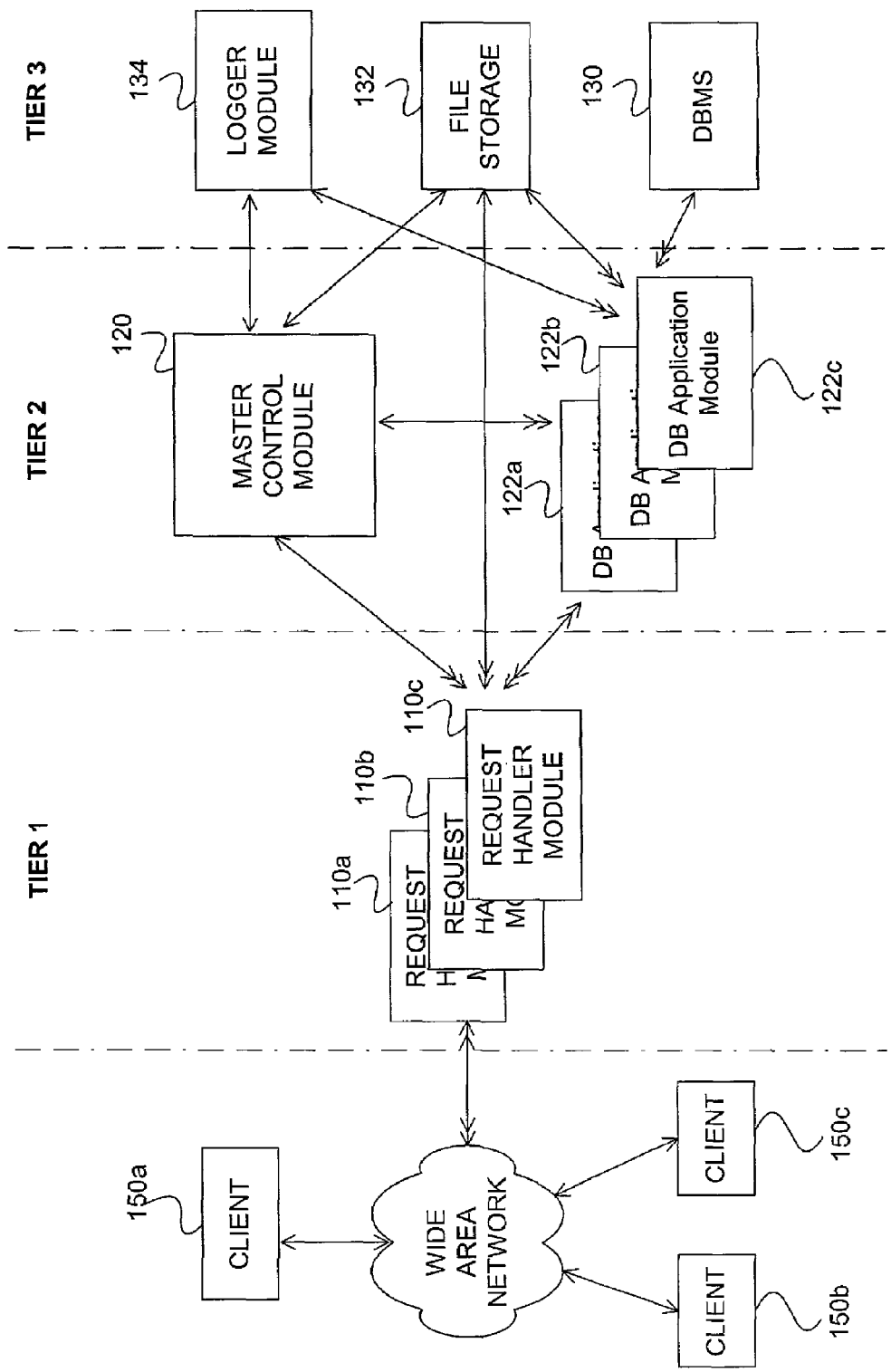
FIG. 1 is a schematic diagram illustrating an embodiment of a database management system in accordance with the present invention.

The schematic diagram of FIG. 1 illustrates an embodiment of database management system 100 according to one embodiment of the present invention. The system includes a first tier with a plurality of request handling modules (RHM) 110*a–c*, a second tier including a master control module (MCM) 120 and a plurality of database application modules (DBAM) 122*a–c*, and a third tier including a back end database management system server (DBMS) 130, a file storage server 132 and a logger service server 134.

Various database users respectively operate their client machines 150*a–c* to make database requests. The client machines 150*a–c* are conventional. They may, for example, be personal computers, portable computers (e.g., laptops, palmtops, and the like) using conventional operating systems and web browsers to access the Internet and World Wide Web. The client machines 150*a–c* interface with RHMs 110*a–c*, which buffer database requests and corresponding responses between appropriately matched DBAMs 122*a–c* and client machines 150*a–c*. The RHMs 110*a–c* may also provide static content, such as a home page that allows users to initialize and register to use the database system, and provide additional features such as SSL encryption for communications between client devices and database servers. Although multiple RHMs 110*a–c* are shown, embodiments with a single RHM are equally applicable to the present invention. The RHMs 110*a–c* reside in one or more conventional web server machines, and carry out the request handling functionality described herein using conventional common gateway interface (CGI) and/or internet server application program interface (ISAPI) based platforms and programming techniques. The ordinarily skilled artisan will recognize the various additional alternative environments, such Java, simple object access protocol, active server page, and others.

Together, the MCM module 120 and the DBAMs 122*a–c* are responsible for handling database requests. A database identifier (DBID) uniquely identifies each database managed by the system. In a simple example each DBID is a number that is sequentially issued each time a new database is created. Preferably, DBID generation is managed by the MCM, although it may also be managed elsewhere, such as in shared storage.

The MCM 120 maps DBIDs to DBAMs 122, and manages the assignment of databases to DBAMs 122*a–c*. Further, the MCM 120 communicates such database assignments to RHMs 110*a–c* responsive to database requests. Preferably, the MCM 120 runs on a single conventional application server, but is multi-threaded to allow concurrent task handling. Alternatively, the functionality of the MCM 120 may be spread among multiple server machines. In this alternative, the MCM 120 would preferably access a centralized resource to store the mapping, or an algorithm for distributing requests based upon DBID alone.

The DBAMs 122*a–c* handle requests including general requests and database requests. General requests include administrative options such as user profile and set up changes and the like. Database requests include operations such as viewing and adding a record for a given database, and the like. The DBAMs 122*a–c* may reside on an application server. Although they can run on the same application server as the MCM 120, they preferably reside on a separate server. It is also preferable for the DBAMs 122*a–c* to run on several servers, particularly where database assignments are updated to accommodate database migration, as will be described further below.

The DBMS 130 and the file storage module 132 provide and manage system data and database storage. Preferably, the DBMS is a relational DBMS, although a non-relational system may be implemented as well. The DBMS 130 stores shared information. An example of the shared information is user registration and account personalization information. Preferably, the user experience in operating the database system will be customizable. Thus, for example, the user may have a list of favored databases that may be easily accessed. The shared information will include the identification of the user, and an association of the user to their favored databases, among other things. The shared information also includes the names of the databases, access control lists (ACLs), and other information. The DBMS 130 can implement conventional programming languages such as structured query language (SQL) for database management operations. It may be embodied as a multithreaded server running on a single database server such as MS SQLServer 2000. The artisan will recognize the various alternatives, including spreading the functionality among a number of separate servers, and alternative programming languages.

The file storage module 132 persistently stores the database files, and communicates the same to the appropriate DBAM 122*a–c*. The file storage module 132 can run on a conventional storage area network, or may be a dedicated file server. Although various embodiments are possible, a preferred implementation uses Compaq StorageWorks.

Finally, the logger service module 134 communicates with the DBAM modules 122*a–c* and the MCM 120, and saves information to its files for subsequent reporting and analysis.

Figure 2:
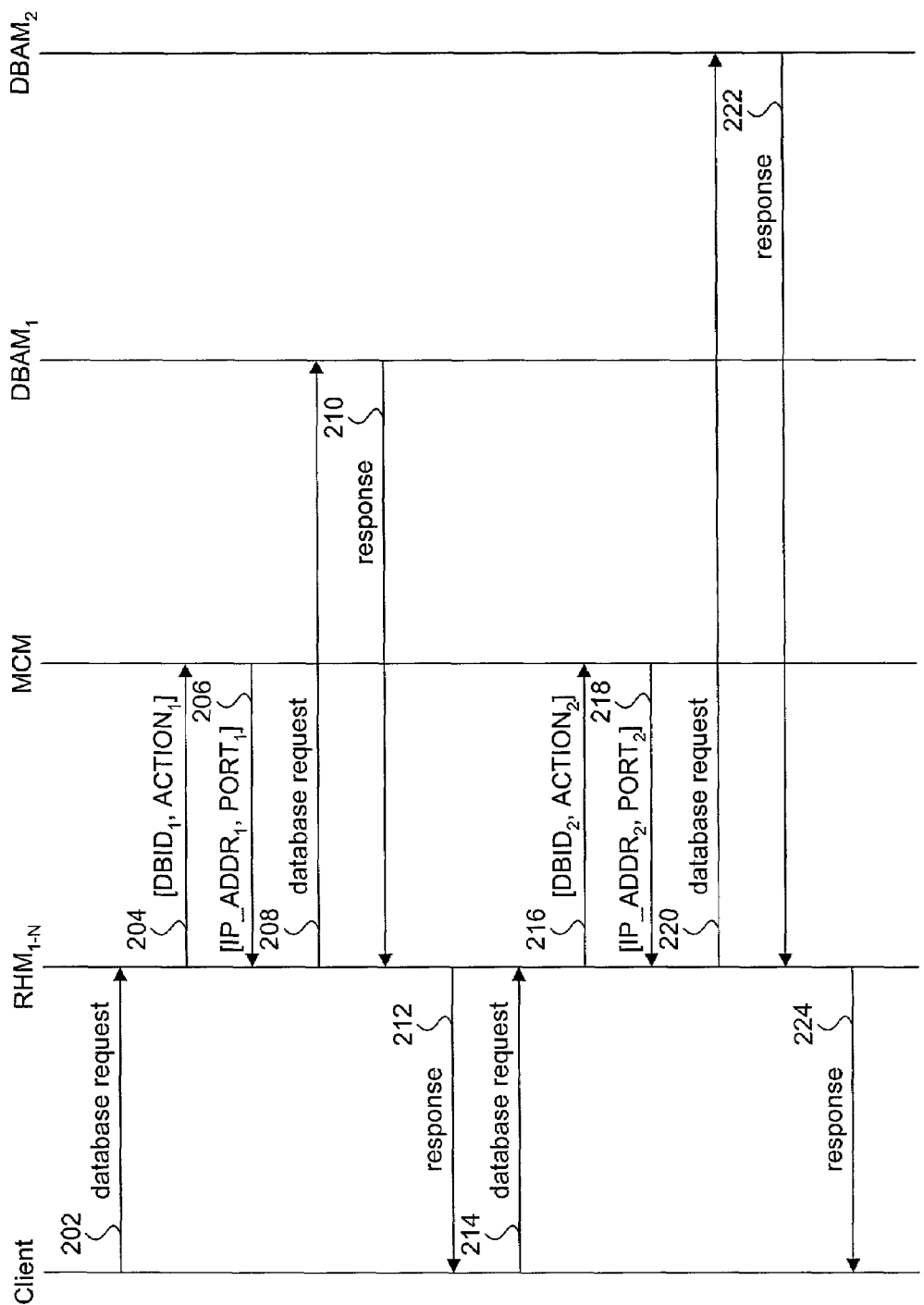
FIG. 2 is an event diagram illustrating the determination of database server assignments with the database management system.

The event diagram of FIG. 2 illustrates an embodiment of database management in accordance with the present invention in further detail. Here, a client device 100 makes a database request 202 that is received by any of the request handling modules (i.e., one of $RHM_{1-N}$) in the system. A user who has previously registered to use the database system or who has been invited to access a database managed by the system will typically initiate this request by operating their client device. The database request may include an Action and a DBID, which are extractable by the RHM. This can be accomplished using a predetermined syntax for identifying DBIDs and Actions, such as by designation in a conventional HTTP string. In the example where a user is invited to access a database, the invitation may be in the form of a hyperlink that has an associated DBID. Selecting the link prompts transmission of the DBID and an Action corresponding to the database to the RHM. The link may take various forms, but an example is <<http://www.quickbase.com/db/dbid#?act=display_record~RID=recordid#.<< There, DBID is represented as the value dbid#, which could be any number or other identifier, and the action is display_record. Other information can be provided, again according to predefined syntax, such as the identification of the record by the value recordid#. Various actions are well known including, without limitation, "display_record", "edit_record" and "list_all".

There are also numerous alternatives for navigating to links. The user may navigate to a database selection page such as one prompted by selecting a "My Favorite Databases" tab or the like from a personalized database system base page. Selecting one of several links identifying the user's databases may then make database selection. Each of these databases will have an underlying DBID. Still further, there may be hyperlinks on pages as a result of other DB operations. For example, a displayed record may have an edit hyperlink that is displayed on the page with the record. The artisan will recognize the various alternatives.

When the user makes a database request, the RHM transmits 204 the appropriate DBID and, optionally, the Action to the MCM, which uses the DBID to determine which DBAM presently owns the corresponding database. The MCM maintains a table correlating DBIDs to DBAMs, preferably in the form of an SQL table or a text file residing in cached memory to improve response times. A persistent copy of the table may also be provided on disk so that current DBID to DBAM relationships are retained for an initialization sequences. Alternatively, the table may be rebuilt dynamically, wherein the DBAMs are each polled by the MCM in order to recompile the current relationships. The available DBAM candidates can be listed persistently, so that each DBAM on the list can be quickly identified and polled in an initialization sequence.

As shown in FIG. 2, a particular $DBID_1$ may be mapped to a particular $DBAM_1$. The MCM sends 206 information allowing the RHM to locate the assigned $DBAM_1$, such as its IP address and port information [$IP\_ADDR_1$, $PORT_1$]. Once the assigned DBAM is identified and located, conventional database processing techniques can be implemented to produce a result corresponding to the action. The RHM sends 208 the database request to the assigned $DBAM_1$, which executes the action and returns 210 a response to the RHM, which in turn transmits 212 the response to the client device. A failure may also be transmitted where appropriate. Preferably, the database is loaded into and left under the control of the assigned $DBAM_1$ during and beyond processing the request, until control is relinquished whereupon the database may be unloaded. Additionally, the database is preferably locked out once it is owned by the $DBAM_1$. The database can be loaded and unloaded at the discretion of the assigned $DBAM_1$, but it is preferably managed by only one DBAM at a time. The combination of the mapping provided by the MCM and this DBAM ownership retains database integrity.

Requests can similarly be received and responded to by the various RHMs without requiring them to maintain information on the DBAMs. Thus, a client transmits 214 a database request to an $RHM_{1-N}$, which extracts and transmits 216 the corresponding DBID and Action [$DBID_2$, $ACTION_2$] to the MCM, which in turn transmits 218 the location information for the assigned DBAM [$IP\_ADDR_2$, $PORT_2$]. The appropriate $DBAM_2$ then responds 222 to the database request 220 by the RHM and that response is provided 224 to the client device.

Figure 3:
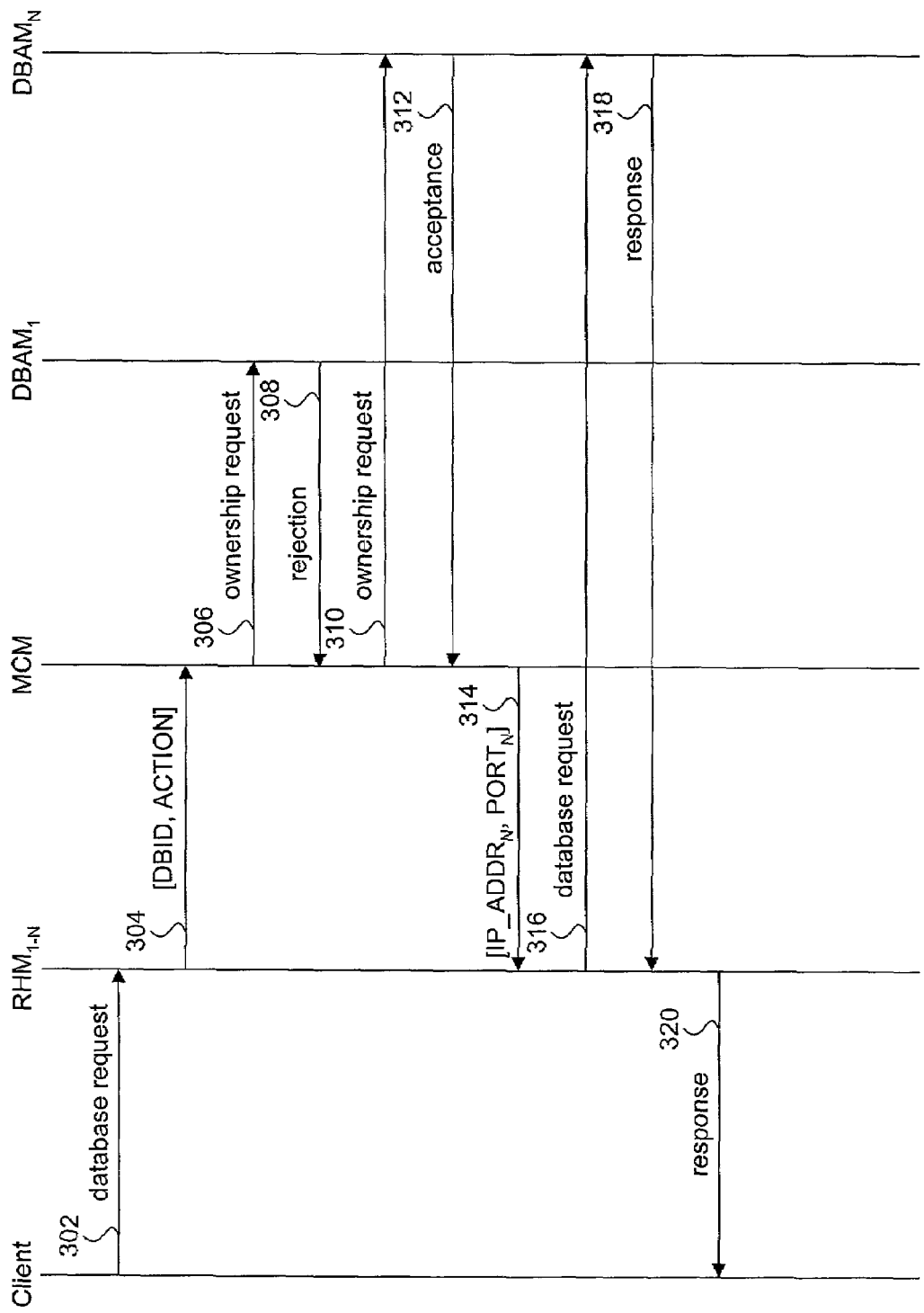
FIG. 3 is an event diagram illustrating the determination of alternative database server assignments with the database management system.

For various reasons, such as a DBAM going out of service or a previous assignment lapsing due to inactivity or the like, a DBID may not have a currently assigned DBAM. Where a DBID is not found in the mapping table or is not currently assigned to a DBAM, the MCM determines an assignment, updates the mapping table, and identifies the assigned DBAM for completion of the database request. The event diagram of FIG. 3 illustrates the procedures in such a scenario. The client device transmits 302 a database request to an RHM which extracts and sends 304 the database identifier DBID and ACTION to the MCM. If the MCM does not find the value DBID in the table or finds that DBID is currently unassigned, the MCM sends a message 306 to a DBAM (e.g. $DBAM_1$) asking it to take ownership of the database. If the desired DBAM rejects or fails to respond to this request (e.g., $DBAM_1$ is shown to transmit a rejection 308 message), then the MCM attempts to assign the database to other DBAMs until the assignment is accepted. In this example, $DBAM_N$ accepts 312 a request 310 for assignment. The MCM updates the mapping table to reflect the valid database assignment, and the $DBAM_N$ loads the database from file storage and updates its listing of owned DBIDs. Then the database request can be fulfilled in the same fashion as was described above. Namely, the IP address and port [$IP\_ADDR_N$, $PORT_N$] for the assigned $DBAM_N$ are sent 314 to the appropriate RHM, which then sends 316 the database request to the $DBAM_N$, which executes the database request, and transmits 318 a response to the RHM, which in turn transmits 320 the response to the client device. The above process can also be provided where the MCM seeks to reassign a database to a new DBAM for any reason. There, the DBAM that initially owns the database would be asked to release the database prior to invoking the above described assignment sequence.

Figure 4:
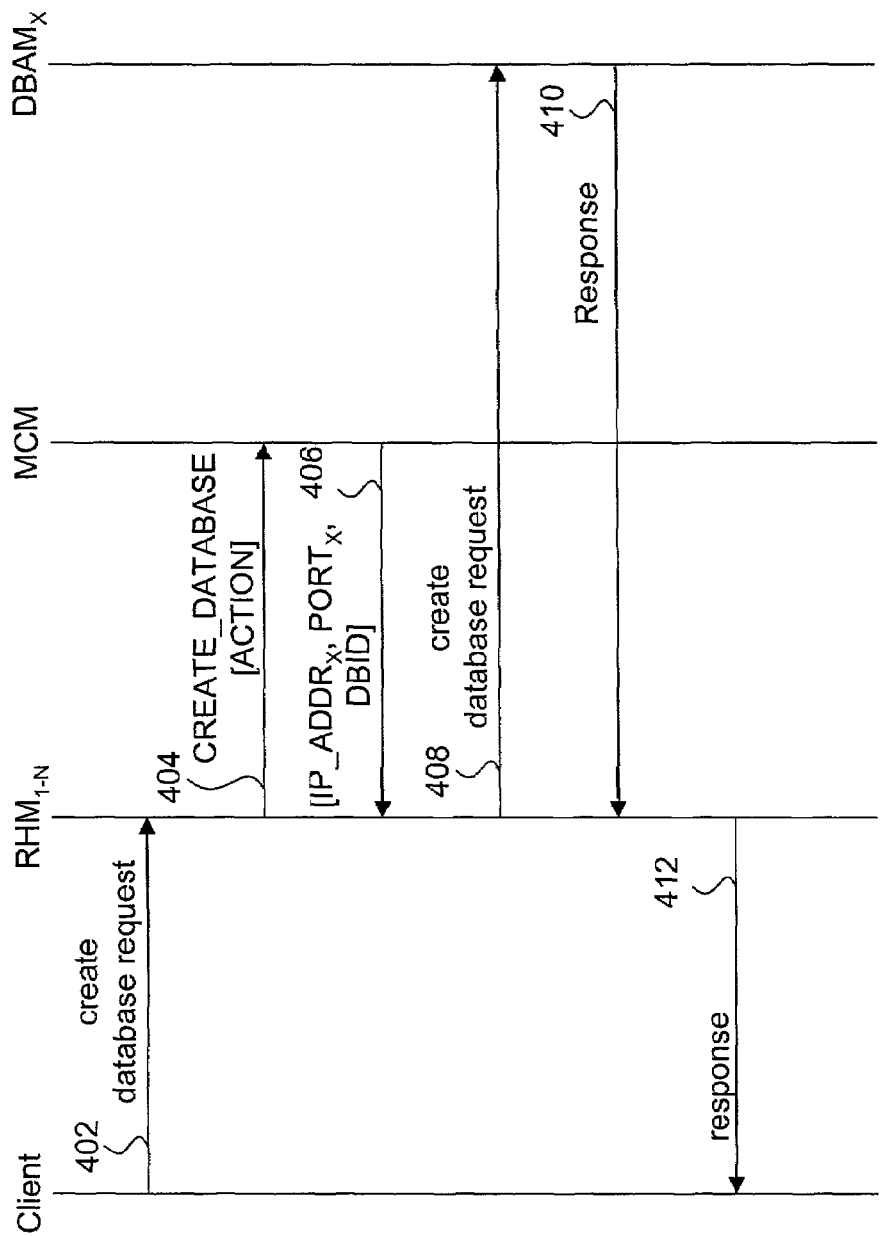
FIG. 4 is an event diagram illustrating the creation and assignment of a new database to a database server.

One type of database request is to create a database. Databases are variously created. For example, they are originally created "from scratch", or "cloned" from a previously existing database or template, etc. In any case, the database to be created does not initially have a DBID or an assigned DBAM. FIG. 4 illustrates an embodiment of creating a database within the database management system. Again, the user navigates among appropriate pages to ultimately cause a "create database" request to be transmitted 402 to an $RHM_{1-N}$. Various conventional techniques can be used to display a series of web pages allowing the user to log in, select a database template if desired, and arrange the fields of the database may be implemented. The user may then use a submit button or the like, which prompts transmission 402 of the create database request. The RHM receives the create database request, then extracts and sends 404 the action to the MCM. The MCM recognizes the action as "create_database" and then assigns a DBAM to the new database. This may involve the previously described request and acceptance exchange between the MCM and candidate DBAMs (not shown in FIG. 4). Part of the process of assigning a DBAM involves the generation of a new DBID, which is managed by the MCM. Once an appropriate $DBAM_x$ is assigned, the location information and the new DBID [$IP\_ADDR_x$, $PORT_x$, DBID] are transmitted 406 to the RHM, which then forwards 408 the request to create a database to the assigned $DBAM_x$. This request preferably includes the new DBID. The $DBAM_x$ then creates the new database by creating a file in the file system and updating the SQL tables in the DBMS. Particularly, the DBAMx creates the database in memory, then copies the created database to the file system and updates the DBMS to reflect the association of the database file name to the DBID. When a new $DBAM_y$ is subsequently assigned the DBID, it receives the DBID from the MCM, which can then be used to look up the file name in a database loading procedure. Still referring to FIG. 4, in the fashion described above, the $DBAM_x$ and RHM then complete the response 410, 412 to the user's request to create the database. Thereafter, user requests corresponding to the database will prompt transmission of the new DBID to the MCM for handling by $DBAM_x$ until the database is terminated or reassigned.

In an alternative to the above, once a $DBAM_x$ is assigned, the location information [$IP\_ADDR_x$, $PORT_x$] is transmitted to the RHM, which then sends the user's request to create a database to the $DBAM_x$. The $DBAM_x$ and/or the MCM then generate the new DBID, and the MCM updates its mapping table accordingly, with confirmation to the $DBAM_x$. The $DBAM_x$ and RHM then complete the response to the user's request to create the database.

As mentioned above, the Action can be optionally sent to the MCM along with the DBID. Preferably, with this option the Action is used in the DBAM assignment process. That is, MCM and/or DBAM can assign the Action to the most appropriate DBAM based upon various considerations. For example, a load balancing algorithm may be used to assign a computationally extensive Action to a DBAM having high relative remaining capacity.

According to the present invention, the MCM also becomes a focal point for knowledge and/or knowledge based decision-making regarding DBAM assignments. Thus, an algorithm that migrates database assignments to appropriate DBAMs based upon usage patterns or other criteria may be implemented using the information managed by the MCM. This alternative is explained further below.

There will be other types of requests beyond the above described database requests (e.g., add a record within an existing database, create a new view, requests to create a database, etc.). For example, there may be general requests that are not necessarily associated with one of the user's owned or invitee databases. Examples of these include changing user profile information, finding a database by name, browsing for templates, and creating user groups. These general requests are still received by the RHM and are handled similarly to the database request, but the MCM can choose an arbitrary DBAM to handle the request, possibly using load balancing considerations, or simply a round robin assignment. Main administrative options (e.g., various system limits, timeouts, algorithm parameters, etc.) are handled similarly by an arbitrary DBAM. The assigned DBAM saves the new administrative settings on the database_system.ini file on shared storage, notifies the MCM of the new settings, which then requests all current DBAMs to reload their settings from the database_system.ini file. Preferably, this file is shared by all DBAMs, and is saved on the file storage system with the database files.

Figure 5:
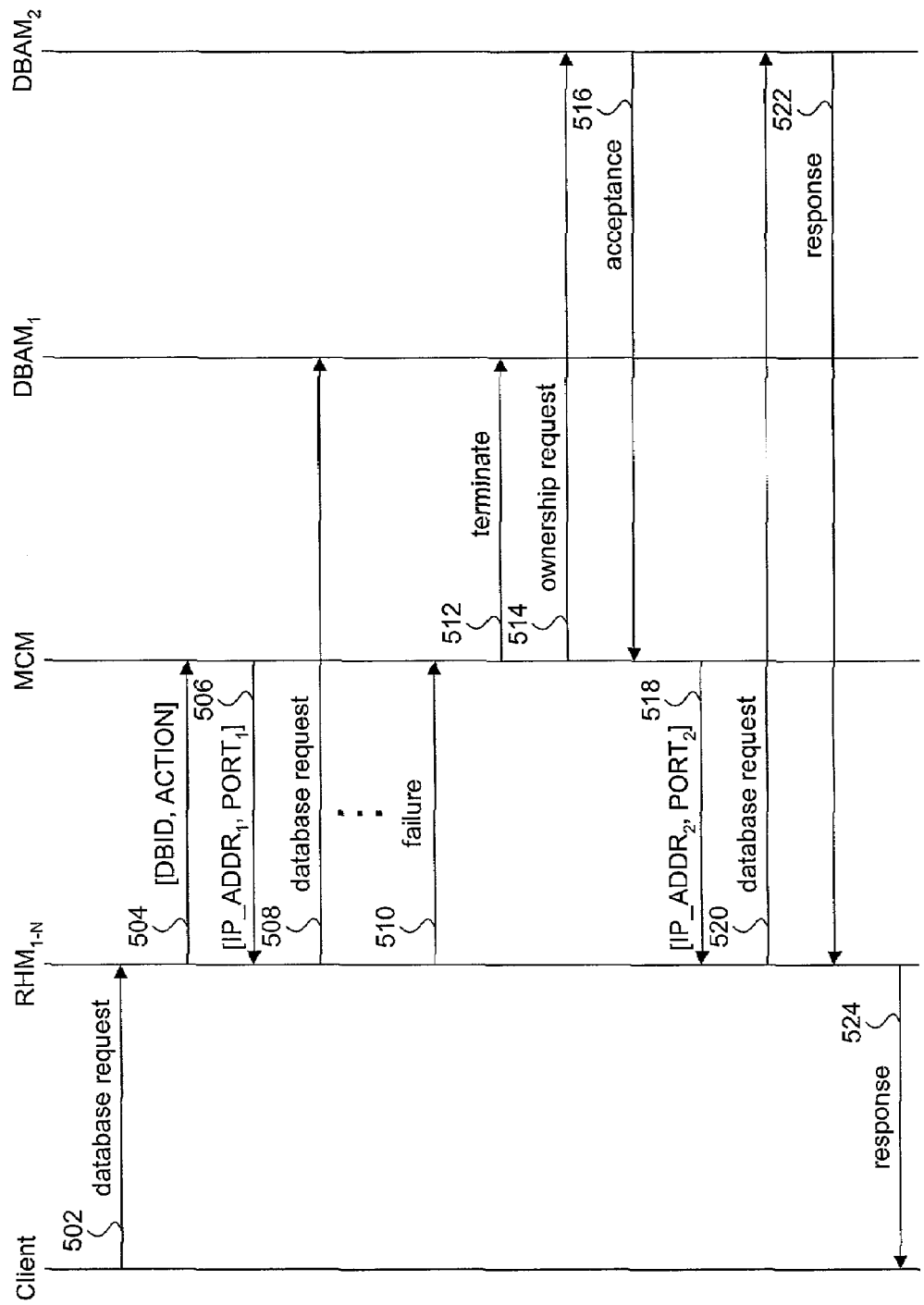
FIG. 5 is an event diagram illustrating a failure recovery procedure used by the database management system.

FIG. 5 illustrates a failure recovery scheme that is invoked upon DBAM failures according to another aspect of the present invention. In the fashion described above, a client device sends 502 a database request to an $RHM_x$ from the group $RHM_{1-N}$, which extracts and sends 504 the DBID and ACTION for the request to the MCM and receives 506 the assigned DBAM location information [e.g., $IP\_ADDR_1$, $PORT_1$] from the MCM. After this stage, if the $RHM_x$ either cannot connect to the DBAM or the DBAM accepts the database request 508 but doesn't respond within a predetermined amount of time, the $RHM_x$ sends 510 a failure message to the MCM indicating which DBAM (e.g., $DBAM_1$) failed, including the symptoms of failure. The MCM analyzes the failure and where appropriate asks the $RHM_x$ to repeat its request to the same $DBAM_1$. Where the repeated request is not appropriate, the MCM terminates 512 the offending $DBAM_1$ and assigns the database request, as well as ownership of all databases owned by the $DBAM_1$ to another DBAM, such as by sending 514 and receiving acceptance 516 of an ownership request to an available $DBAM_2$. Alternatively, the owned databases can be reassigned to various other DBAMs. Further, some or all of them may remain unassigned, perhaps until a request comes in to prompt a reassignment. The information regarding all owned databases is found in the MCM's mapping table. MCM can also inform each $RHM_{1-N}$ about a termination sequence if desired, so that they do not rely upon pending requests but instead reinitiate with the newly assigned DBAM. Thus, as indicated, the MCM sends 518 the new location information [$IP\_ADDR_2$, $PORT_2$] to the $RHM_x$, and then the request can be fulfilled as previously described by sending 520 the database request to the newly assigned DBAM2 and sending 522, 524 a corresponding response to the client device.

Failure recovery can also be provided for the MCM by providing a shadow MCM. There, the shadow MCM is continuously updated to reflect changes in the primary MCM. If the primary MCM fails, then the shadow MCM is invoked, and implements an initialization procedure that ensures that all current DBAM assignments are valid and non-conflicting.

Figure 6:
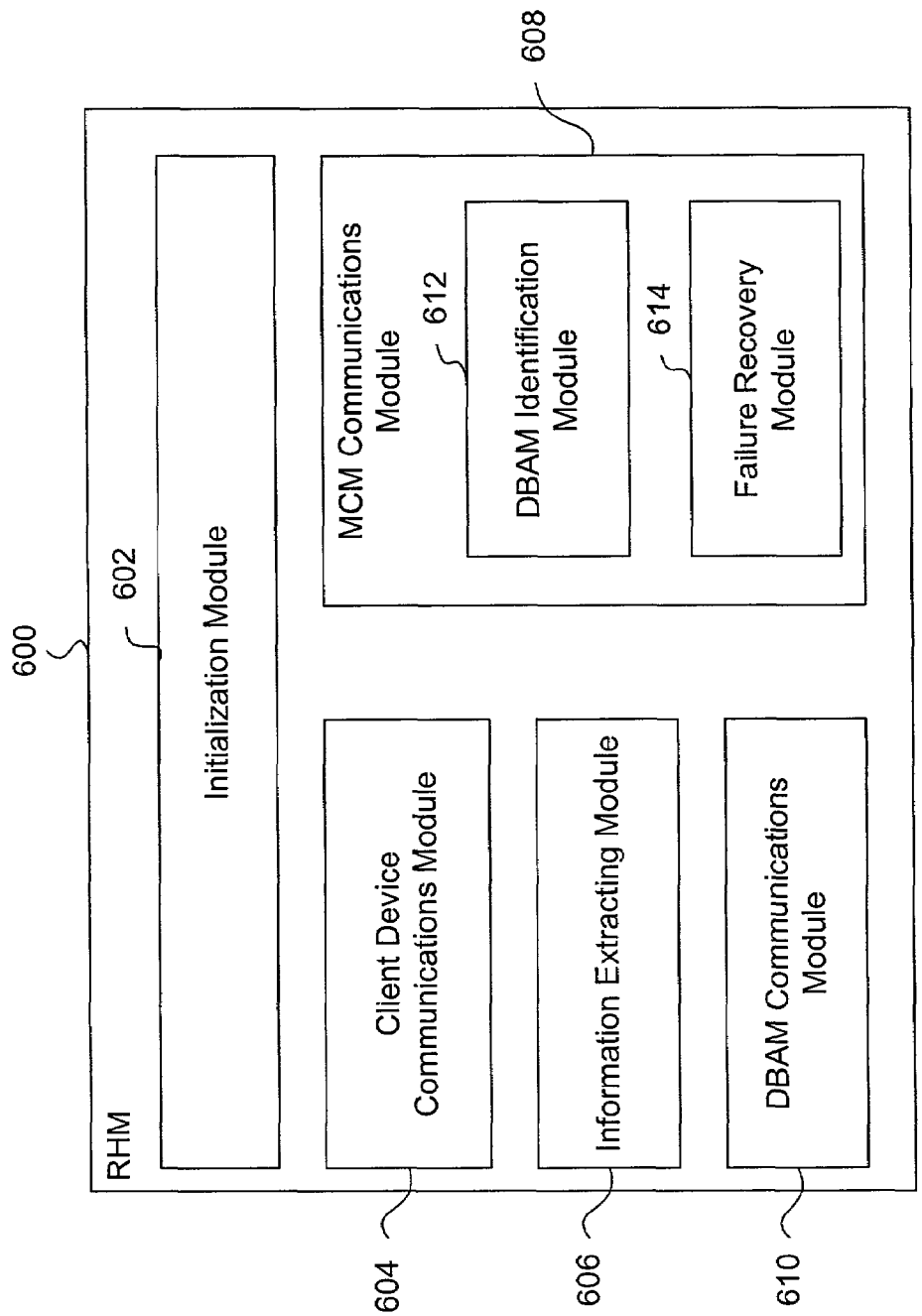
FIG. 6 is a block diagram illustrating an embodiment of a request handler module used in the database management system.
Figure 7:
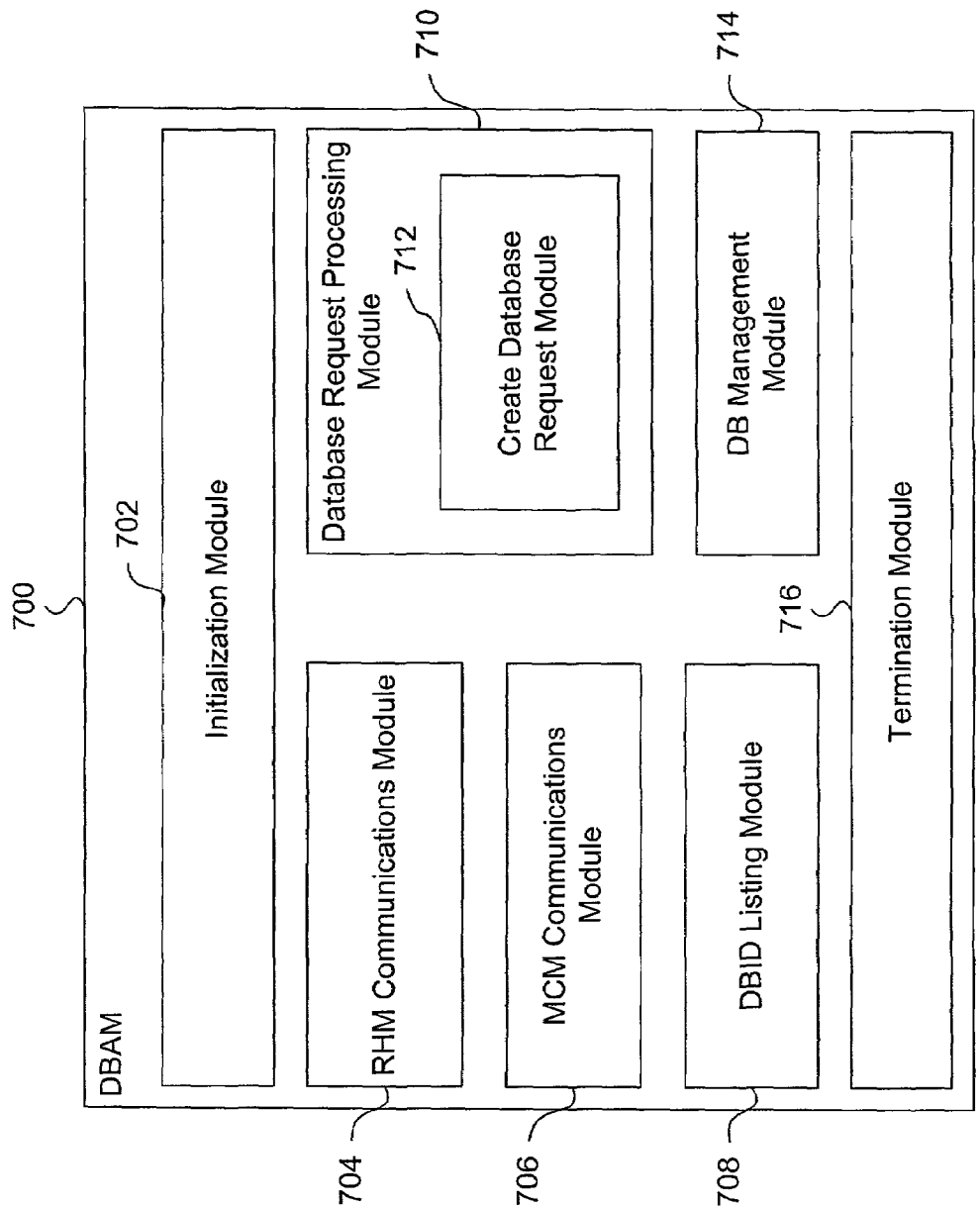
FIG. 7 is a block diagram illustrating an embodiment of a database server module used in the database management system.
Figure 8:
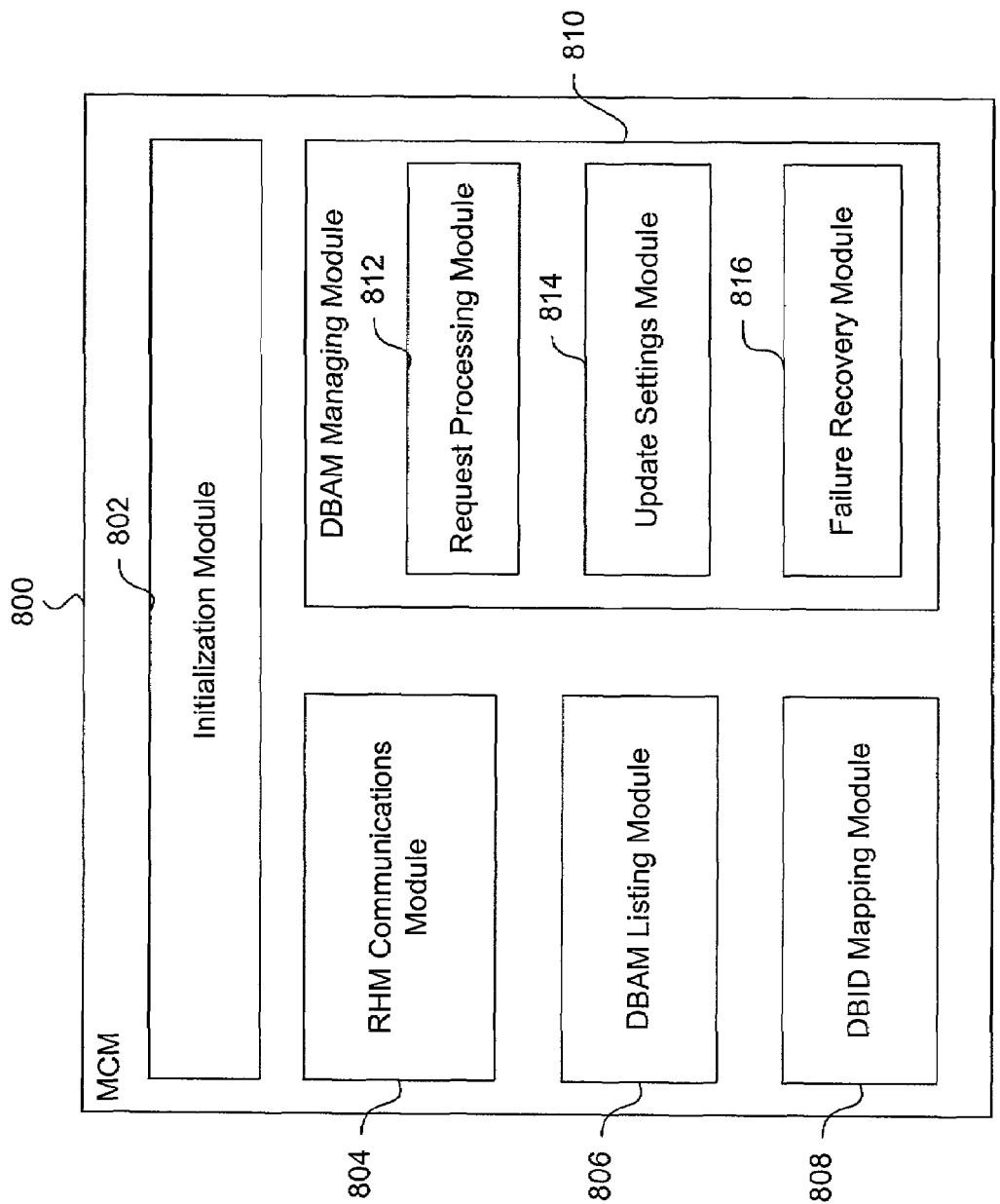
FIG. 8 is a block diagram illustrating an embodiment of a master control module used in the database management system.

FIGS. 6–8 are block diagrams that respectively illustrate embodiments of an RHM, DBAM and MCM according to the present invention. Their functionality can be replicated by embodiments having fewer or more modules than those shown therein, and the present invention is not necessarily limited by the number of modules or discrete division of functionality found in one embodiment.

The RHM 600 of FIG. 6 includes an initialization module 602, a client device communications module 604, an information extraction module 606, a DBAM communications module 610, and an MCM communications module 608 that includes a DBAM identification module 612 and a failure recovery module 614. The RHM 600 may include other functionality, such as that which allows it to communicate with third tier modules to access and modify user registration and other shared information in conventional fashion, which need not be shown modularly.

The initialization module 602 includes routines corresponding to an RHM start up sequence. It discovers location information for the MCM, and, where applicable a shadow MCM when the RHM 600 is initiated. This can take the form of an initialization file (e.g., .ini) that maintains the IP address and port for the MCM, and that may be updated based upon communications with the MCM.

The client device communications module 604 retains information regarding client devices that have made database requests through the RHM 600. Conventional network communications techniques (e.g., HTTP, TCP/IP) allow the RHM 600 to communicate with the client device and to thereby receive database requests and the like. The information extracting module 606 accesses the database request and extracts the Action and the DBID from the request. The database request is retained in association with the client device so that responses can be appropriately delivered to the user. The DBID and Action may be identified as part of a known syntax. For example, in an HTTP environment a link may contain the DBID and Action in known locations.

The MCM communications module 608 includes various routines for maintaining communications with the MCM. The DBAM identification module sends a request to the MCM containing the Action and DBID, and awaits a response having the DBAM location information (e.g., IP_ADDR, PORT). If an error is returned, such is passed back to the user through client device communications. If the location information is successfully returned, the information is provided to the DBAM communications module 610 and the database request is sent to the appropriate DBAM. If the DBAM responds, the corresponding success or failure message is passed back to the user through the client device communications module 604. If the DBAM cannot be contacted or does not respond within a given time period, then such is reported to the error recovery module 614, which terminates the connection to the non-responsive DBAM if applicable and sends an error recovery message to the MCM, which initiates the termination process described in connection therewith.

The block diagram of FIG. 7 illustrates an embodiment of a DBAM 700, which includes an initialization module 702, an RHM communications module 704, an MCM communications module 706, an owned DBID listing module 708, a database request processing module 710, a DB management module 714 and a termination module 716.

The initialization module 702 contains routines for creating a socket having a generated port number for receiving requests, opening a connection with the MCM port, and sending the generated port number to the MCM.

Upon successful completion of the initialization sequence the DBAM 700 awaits various types of requests. Communications with the RHM and MCM may be respectively initiated using the communications modules 704, 706. Database requests are handled by the database request processing module 710, which includes routines for receiving a database request. The database request can include a DBID as described above. The DBID listing module 708 maintains the DBIDs for all DBs owned by the DBAM 7000. Upon receipt of the database request, the database request processing module 710 gets the DBID and checks the DBID list. If the DBID is found in the list, the request is processed in normal fashion. The database owned by the DBAM will typically be loaded for handling database requests, and persistently stored in the file server. If the request can not be processed an error is returned. Either of these communications are made through the RHM communications module 704.

The create database request module 712 handles the new database assignments prompted by user requests to create a database. In this case, the DBID is known to be absent from the DBID listing by mere identification of the Action. A database creation sequence, such as is described in connection with FIG. 4 is provided. The MCM generates a DBID and assigns a DBAM for the new database. Generating the DBID at the MCM ensures that the DBID will be unique to the created database. Preferably, the MCM reports the DBID back to the RHM, which in turn passes the request, including the new DBID, to the DBAM. The DBAM receives indication of the new assignment, and then loads a database from back end file storage. The loaded database is stored so that the DBAM can handle the current and possibly future database requests. An algorithm that releases the database after a period of time, such as 30 minutes, without receipt of a database request may also be provided. Upon confirmation, the result of the request to create the database is returned to the user through the RHM.

The database management module 714 handles a number of different operations, such as updating and reloading system settings, acquiring and releasing DBs at the request of the MCM, and providing lists of information about owned databases to the MCM. Requests to change settings are received from users through the RHM, in response to which shared storage is updated to reflect the changes. Changes in the settings are reported to the MCM, so that it in turn can report the same to the other DBAMs in the system. In those instances, the database management module 714 is prompted to reload the settings by the MCM, and so reads the information from the shared storage. The settings information may be updated and found in a common initialization file or the like.

The database management module 714 also handles requests to acquire DBs for handling. A request arrives from the MCM containing the DBIDs of all databases to be taken over. For each DBID in the list, the database management module 714 checks the DBID listing to determine whether the DBAM 700 already owns the corresponding database. If the DBID is present, no action is required. If the DBID is not listed, then the DBID is added to the list of owned databases, and the database is loaded for handling database requests as described above. A request to release one or more databases can also be received from the MCM, again by listing DBIDs along with a release request. There, the database is unloaded and the DBID value for the removed database is removed form the DBID listing. If this DBAM 700 did not handle the database, no operation is required, other than optional confirmation and reporting to the MCM. Further, the MCM may query the DBAM 700 for the list of all owned databases, in which case the list is simply retrieved and forwarded from the DBID listing module 708.

Finally, the termination module 716 handles termination, or "kill" requests from the MCM. This can be handled as a high priority task that is received on a separate high priority port, or may be otherwise implemented, such as by forcing a program exception in the DBAM through the same port. There, the receiving DBAM 700 terminates all pending database and other request processes and relinquishes ownership of all DBs, passing the full DBID list to the MCM.

The block diagram of FIG. 8 illustrates an embodiment of an MCM 800 including an initialization module 802, an RHM communications module 804, a DBAM listing module 806, a DBID mapping module 808, and a DBAM managing module 810.

The DBAM listing module 806 contains a list of descriptive information for each current DBAM in the system, including a DBAM ID, IP address and port information. The DBID mapping module 808 contains all DBIDs and maps them to entries in the DBAM list. The MCM also maintains a settings file (not shown) that contains information such as the port number for the MCM and that used to manage the initialization of a number of DBAMs in a start up sequence.

The initialization module 802 reads the settings file. For each of DBAM, it generates an identifier, IP address and port number. A corresponding entry containing each piece of information is added to the DBAM listing module 806. Error recovery can also be provided by polling all DBAMs in the existing list and requesting DB ownership information from each DBAM, updating the DBID mapping and DBAM list for each successful response. The artisan will recognize the alternatives.

The DBAM managing module 810 receives database and other requests from the RHM and ensures handling by the appropriate DBAM. The request processing module 812 receives an Action and determines whether it has an associated DBID. If so, it looks the DBID up in the DBID mapping module 808, and returns the location information of the associated DBAM. If there is a DBID but it is not found in the mapping module, it identifies an available DBAM from the listing module 806, sends the identified DBAM a request to acquire the database, updates the DBID map upon acceptance, and returns the location information for the accepting DBAM. If there is no DBID with the Action, then a process such as a round robin process is invoked to assign the Action to a DBAM with appropriate updating of the DBID mapping module 808.

The settings change module 814 receives a request from a DBAM indicating a change of settings, and then commands every other DBAM in the DBAM listing to update their settings. The DBAM managing module 810 also receives requests to create databases, by generating a new unique DBID for the created database, assigning the database to be created to a DBAM, updating the mapping accordingly, and reporting the new assignment to the RHM and/or DBAM. Finally, the failure recovery module 816 responds to an RHM indication of an assigned DBAM failure. It may optionally attempt to contact the subject DBAM to determine whether it remains operational and return the same location information to the RHM where appropriate. If that option is not used, or the DBAM does not respond, then the failure recovery module 816 initiates a termination sequence. It removes the DBAM from the DBAM list, obtains all DBIDs corresponding to the terminated DBAM, and sends requests to require each DBID until all of the databases have been reassigned (a single newly invoked DBAM may take over all of the databases that were handled by the terminated DBAM as well).

The primary sequence for forwarding a database request to a DBAM for handling is as described, wherein the MCM examines the DBID in the request, looks up the associated DBAM in its tables, and returns the forwarding information to the RHM. Other aspects of the present invention handle the following request handling scenarios. Specifically, (1) Some requests act on more than one database; (2) some requests act on one database, but do not have the DBID embedded in the request so they appear to be general requests but are actually database requests; and (3) some requests do not apply to a particular database, but must be performed on a specific DBAM, because they report the status of that DBAM. These cases are handled in the following ways.

Case (1): The request contains the DBID of one of the databases needed by the DBAM to handle the request. The MCM forwards the request to the DBAM assigned to that DBID. The DBAM analyzes the request and determines that additional databases are needed to completely process it. It then responds to the RHM with a special error indicating that it cannot process the request because it does not own all the databases necessary. It also includes in its response a list of the DBIDs of the databases necessary. The RHM handles this error like other errors, and re-contacts the MCM to report the error. The MCM recognizes the error and migrates one or more of the required databases between DBAMs so that they all end up in the same DBAM, and then tells the RHM to resubmit the request to that DBAM. This second time around, all the required databases will be owned by the DBAM and it will process the request.

Case (2): The request does not contain a DBID, so the request is forwarded to some DBAM based on other criteria, such as load considerations, a round-robin algorithm, or some other method, just like other non-database specific requests. When the DBAM receives the request it determines the actual databases that are necessary, and responds with an error in the same way as described in Case (1). The response to that error is the same as described above.

In the above cases an algorithm is used to decide which databases to migrate, and to which DBAM they should be migrated. The algorithm is designed to avoid "thrashing," a situation in which a database is moved to one DBAM then to another in rapid succession a large or potentially unlimited number of times, causing performance degradation. The algorithm examines the required DBIDs, and moves all of them to the DBAM associated with the lowest numbered DBID. This algorithm, when applied to any combination of subsets of DBIDs at different times, will never cause a migration cycle to occur, so it puts an upper bound on the number of times a database will be moved.

Case (3): The request does not contain a DBID, but must be directed to a particular DBAM. In these cases, the request has a DBAM ID embedded in it. The MCM recognizes this DBAM ID and uses that information to look up its location information (IP address and Port number) instead of using a DBID as in the primary case. The MCM then sends this information back to the RHM which sends the request to the right DBAM.

According to still another aspect of the present invention, a particular database can be migrated by assigning it to a DBAM at a new location. The choice of the new location can depend on various criteria, such as usage data, or more particularly the location of database users. For example, where usage data suggests that a substantial percentage of users of a given database access it from a particular local area network or network segment, the assignment of the given database can be updated to be a new DBAM located on the edge of their network. Migration can be controlled by the MCM, by asking the current DBAM to unload the database to back end file storage, and then asking the new DBAM to load the database, as described above. Alternatives where the database and control are directly passed between the old and new DBAMs may also be provided.

Figure 9:
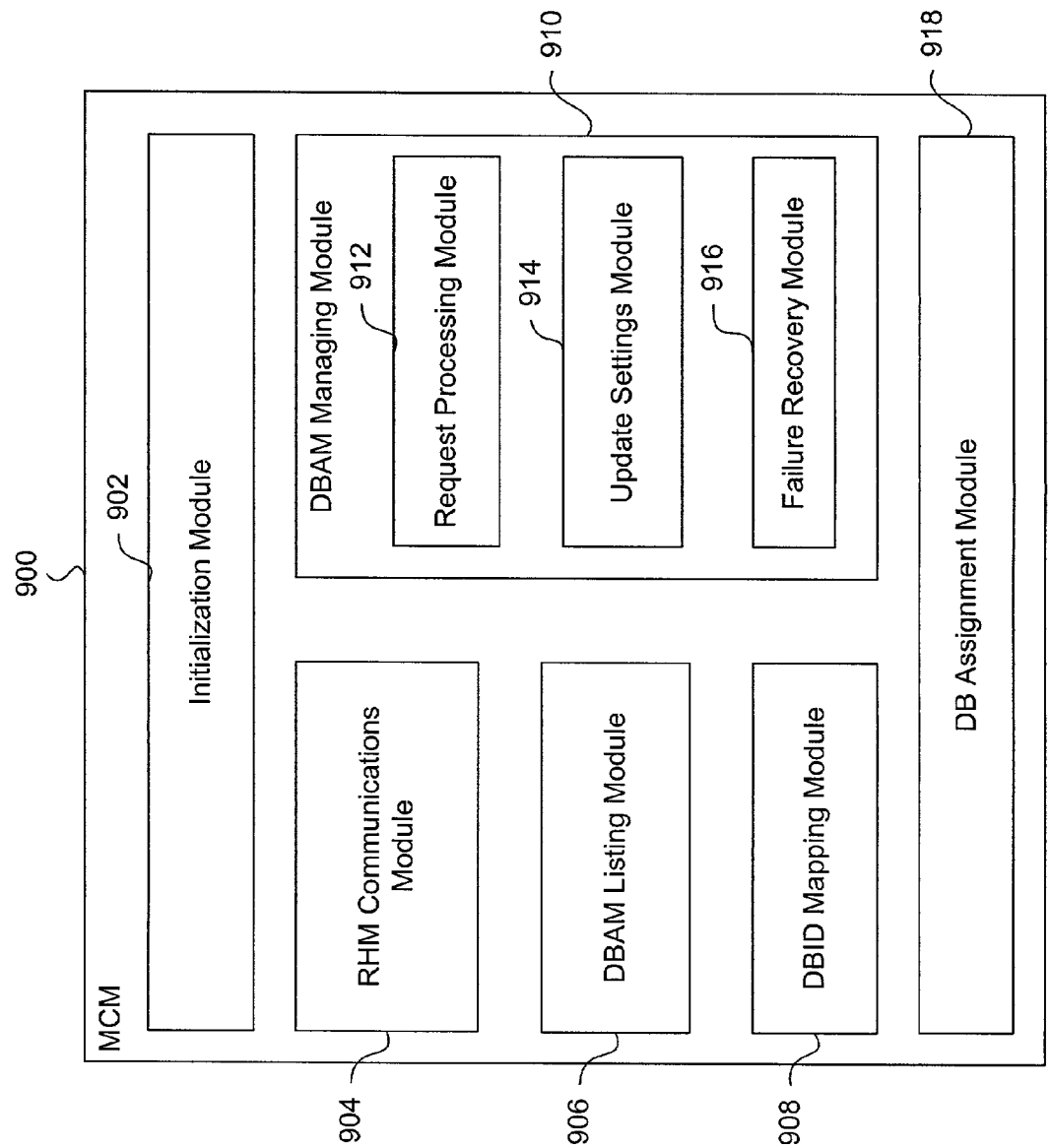
FIG. 9 is a block diagram illustrating another embodiment of a master control module, including database migration functionality.

FIG. 9 illustrates an embodiment of an MCM 900 that incorporates this functionality, including an initialization module 902, an RHM communications module 904, DBAM listing module 906, DBID mapping module 908, a DBAM managing module 910 with a request processing module 912, an update settings module 914, and a failure recovery module 916 that are all analogous to the corresponding modules 802–816 in the previously described MCM 800.

This MCM 900 further includes a DB assignment module 918 that stores and manages information that is used to update the assignments of databases to application servers (DBAMs). This information includes the geographic or other high level location information for each DBAM in the system, and can be indexed according to the identifier used by the DBAM listing module 906. Preferably, the MCM 900 generates this information, although it can also be collected from external sources such as from the logger module (134, FIG. 1). This type of information can be derived automatically from network knowledge, or it can be collected as part of a registration or similar process for managing the availability and location of DBAMs. Similarly, the locations of users can be derived or more simply collected as part of a registration process and then tracked. In this case, the database requests or portions thereof sent from the RHM to the MCM can include a value for a user identifier field. This information is mapped to the user's location, and locations can be divided appropriately and stored by the database management system. For example, the registration process may ask for the city, state and country of the user. All user locations may then be divided into any number of categories and numbered. For example, categories may be Pacific Rim Region, Western United States, Midwestern United States, Southeastern United States, Northeastern United States, Western Europe, etc. Each time a database is accessed, or each time a particular Action for the database is requested, a table in the DB assignment module 918 can be updated. It may merely retain a count of the number of times that a particular region has accessed a database identified by its DBID. When the number of database accesses/actions reaches a threshold, an usage analysis is triggered. If usage is disproportionately found in a particular unassigned region, then the database is re-assigned to locate it in the region of majority access. The architecture of the present invention not only allows this data to be collected, but also allows the database to migrate to a new region, while still allowing users from other regions to transparently access the database. The artisan will recognize the numerous variations for migrating the database, including different criteria and different assignment logic, once instructed by this description.

Thus, systems, methods and apparatus for managing databases are provided in accordance with the present invention. Although the present invention has been described in considerable detail with reference to certain preferred embodiments thereof, other embodiments are possible. Therefore, the sprit and scope of the appended claims should not be limited to the description of the preferred embodiments contained herein.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems appears in the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method for handling database requests for client systems over a network, the method comprising:
   receiving at a master control module from a request handler a database request of a client;
   determining by the master control module an assigned database server for handling the database request from a group of available database servers;
   prompting by the master control module the assigned database server to load a database corresponding to the database request;
   providing by the master control module information regarding the assigned database server to the request handler for the request handler to directly provide the database request to the assigned database server for handling the database request.

2. The method of claim 1, wherein determining by the master control module the assigned database server for handling the database request from the group of available database servers further comprises:
   determining that the database request is a request to create a database;
   generating a database identifier for the database; and
   mapping the database to the assigned database server using the database identifier.

3. The method of claim 2, further comprising:
   receiving by the master control module a subsequent database request containing the database identifier;
   using by the master control module the database identifier to determine the assigned database server; and
   providing by the master control module the subsequent database request to the assigned database server for handling the subsequent database request.

4. The method of claim 1, wherein determining by the master control module the assigned database server for handling the database request from the group of available database servers further comprises:
   responsive to determining that there is no database server assigned to handle the database request,
   assigning a selected database server from the group of available database servers as the assigned database server; and
   updating a mapping of previously created databases to their respective database servers to include the assignment of the selected database server to the database.

5. The method of claim 1, further comprising:
   responsive to a failure in the handling of the database request by the assigned database server,
   assigning by the master control module the database request to an alternative database server selected from the group of available database servers; and
   providing by the master control module the database request to the alternative database server for handling the database request.

6. The method of claim 1, further comprising:
   responsive to an elapsed time for the handling of the database request by the assigned database server exceeding a threshold,
   instructing by the master control module the assigned database server to terminate the handling of the database request;
   assigning by the master control module the database request to an alternative database server selected from the group of available database servers; and
   providing by the master control module the database request to the alternative database server for handling the database request.

7. The method of claim 1, further comprising:
   maintaining location information for a plurality of request making clients corresponding to a particular database associated with the database request;
   assigning by the master control module the database request to an alternative database server selected from the group of available database servers by analyzing the location information for the plurality of request making clients; and
   providing by the master control module the database request to the alternative database server for handling the database request.

8. The method of claim 7, wherein the alternative database server is assigned based upon a determination that a substantial number of the request making clients are located closer to the alternative database server than the assigned database server.

9. The method of claim 1, further comprising:
   assigning by the master control module the database request to an alternative database server selected from the group of available database servers, based upon a comparison of a first expected load on the assigned database server and a second expected load on the alternative database server.

10. The method of claim 1, further comprising:
    assigning by the master control module the database request to an alternative database server selected from the group of available database servers; and
    providing by the master control module the database request to the alternative database server for handling the database request.

11. A system for handling database requests for client systems over a network, the system comprising:
    a request handling module for receiving from a client a database request;
    a plurality of database servers for receiving and handling database requests; and
    a master control module, in direct communication with the request handling module and the plurality of database servers, for receiving the database request from the request handling module, determining an assigned database server from the plurality of database servers for handling the database request, prompting the assigned database server to load a database corresponding to the database request, and providing information regarding the assigned database server to the request handling module for the request handling module to directly provide the database request to the assigned database server.

12. The system of claim 11, wherein the master control module is further adapted to determine the assigned database server from the plurality of database servers by determining that the database request is a request to create a database, generating a database identifier for the database, and mapping the database to the assigned database server using the database identifier.

13. The system of claim 12, wherein the master control module is further adapted to receive a subsequent database request containing the database identifier, use the database identifier to determine the assigned database server, and provide the subsequent database request to the assigned database server for handling the subsequent database request.

14. The system of claim 11, wherein the master control module is further adapted to determine the assigned database server from the plurality of database servers by determining that there is no database server assigned to handle the database request, assigning a selected database server from the plurality of database servers as the assigned database server, and updating a mapping of previously created databases to their respective database servers to include the assignment of the selected database server to the database.

15. The system of claim 11, wherein the master control module is further adapted to respond to a failure in handling the database request by the assigned database server by assigning the database request to an alternative database server selected from the plurality of database servers, and identifying the alternative database server to the request handling module responsive to the database request.

16. The system of claim 11, wherein the master control module is further adapted to assign the database request to an alternative database server selected from the plurality of database servers, and to identify the alternative database server to the request handling module responsive to the database request.

17. The system of claim 11, wherein the request handling module is further adapted to respond to an elapsed time for handling the database request by the assigned database server exceeding a threshold by instructing the assigned database server to terminate the handling of the database request, and wherein the master control module is adapted to then assign the database request to an alternative database server selected from the plurality of database servers.

18. The system of claim 11, wherein the master control module is further adapted to maintain location information for a plurality of request making clients corresponding to a particular database associated with the database request, and to assign the database request to an alternative database server selected from the plurality of database servers by analyzing the location information for the plurality of request making clients.

19. The system of claim 18, wherein the alternative database server is assigned based upon a determination that a substantial number of the request making clients are located closer to the alternative database server than the assigned database server.

20. The system of claim 11, wherein the master control module is further adapted to assign the database request to an alternative database server selected from the plurality of database servers, based upon a comparison of a first expected load on the assigned database server and a second expected load on the alternative database server.

21. A method for handling database requests for client systems over a network, the method comprising:
communicating by a master control module directly with a plurality of database servers, for prompting the database servers to load databases the master control module assigning a previously existing database to an assigned database server selected from the plurality of database servers;
receiving by the master control module a set of information about a database request from a request handler;
determining by the master control module from the set of information that the assigned database server corresponds to the database request; and
sending by the master control module an identification of the assigned database server to the request handler.

22. The method of claim 21, wherein the set of information about the database request includes a database identifier for the previously existing database, and the database identifier is used to determine that the previously existing database corresponds to the assigned database server.

23. The method of claim 21, wherein assigning the databases to the database servers farther comprises:
responsive to determining that the previously existing database is not currently assigned to a database server,
assigning a selected database server from the plurality of database servers as the assigned database server; and
updating a mapping that correlates previously created databases to their respective database servers to include the assignment of the selected database server to the previously existing database.

24. The method of claim 21, further comprising:
assigning by the master control module the database request to an alternative database server selected from the plurality of database servers; and
identifying by the master control module the alternative database server to the request handler.

25. The method of claim 21, further comprising:
maintaining location information for a plurality of request making clients corresponding to the previously existing database; and
assigning by the master control module the database request to an alternative database server selected from the plurality of database servers by analyzing the location information for the plurality of request making clients.

26. The method of claim 25, wherein the alternative database server is assigned based upon a determination that a substantial number of the plurality of request making clients are located closer to the alternative database server than the assigned database server.

27. The method of claim 21, further comprising:
assigning by the master control module the database request to an alternative database server selected from the plurality of database servers, based upon a comparison of a first expected load on the assigned database server and a second expected load on the alternative database server.

28. An apparatus for handling database requests for client systems over a network, the apparatus comprising:
a plurality of database servers;

a database server managing module, adapted to communicate directly with the plurality of database servers, for prompting the database servers to load databases, the database server managing module further adapted to assign a previously existing database to an assigned database server selected from the plurality of database servers and to determine that the assigned database server corresponds to a database request by examining a set of information about the database request; and a request handler communications module, for receiving the set of information about the database request from a request handler, and sending an identification of the assigned database server to the request handler.

29. The apparatus of claim 28, wherein the set of information about the database request includes a database identifier for the previously existing database, and the database server managing module is further adapted to use the database identifier to determine that the previously existing database corresponds to the assigned database server.

30. The apparatus of claim 28, wherein the database server managing module is further adapted to assign the databases to the database servers by determining that the previously existing database is not currently assigned to a database server, assigning a selected database server from the plurality of database servers as the assigned database server, and updating a set of database identifiers that;correlate previously created databases to their respective database servers to include the assignment of the selected database server to the previously existing database.

31. The apparatus of claim 28, wherein the database server managing module is further adapted to assign the database request to an alternative database server selected from the plurality of database servers, and wherein the request handler communications module is further adapted to identify the alternative database server to the request handler.

32. The apparatus of claim 28, further comprising:
a database assignment module, in communication with the database server managing module, for maintaining location information for a plurality of request making clients corresponding to a particular database, and assigning the database request to an alternative database server selected from the plurality of database servers by analyzing the location information for the plurality of request making clients.

33. The apparatus of claim 32, wherein the alternative database server is assigned based upon a determination that a substantial number of the request making clients are located closer to the alternative database server than the assigned database server.

34. The apparatus of claim 28, further comprising:
a database assignment module, in communication with the database server managing module, for assigning the database request to an alternative database server selected from the plurality of database servers, based upon a comparison of a first expected load on the assigned database server and a second expected load on the alternative database server.

35. A computer program product for a master control module, for handling database requests for client systems over a network, the computer program product stored on a computer readable medium and adapted to perform operations comprising:
communicating by the master control module directly with a plurality of database servers, for prompting the database servers to load databases the master control module assigning a previously existing database to an assigned database server selected from the plurality of database servers;

receiving by the master control module a set of information about a database request from a request handler;

determining by the master control module from the set of information tat the assigned database server corresponds to the database request; and sending by the master control module an identification of the assigned database server to the request handler.

36. The computer program product of claim 35, wherein the set of information about the database request includes a database identifier for the previously existing database, and the database identifier is used to determine that the previously existing database corresponds to the assigned database server.

37. The computer program product of claim 35, wherein assigning the databases to the database servers further comprises:
responsive to determining that the previously existing database is not currently assigned to a database server,
assigning a selected database server from the plurality of database servers as the assigned database server; and
updating a persistent set of database identifiers that correlate previously created databases to their respective database servers to include the assignment of the selected database server to the previously existing database.

38. The computer program product of claim 35, wherein the operations further comprise:
assigning by the master control module the database request to an alternative database server selected from the plurality of database servers and
identifying by the master control module the alternative database server to the request handler.

39. The computer program product of claim 35, wherein the operations further comprise:
maintaining Location information for a plurality of request making clients corresponding to the previously existing database; and
assigning by the master control module the database request to an alternative database server selected from the plurality of database servers by analyzing the location information for the plurality of request making clients.

40. The computer program product of claim 39, wherein the alternative database server is assigned based upon a determination that a substantial number of the plurality of request making clients are located closer to the alternative database server than the assigned database server.

41. The computer program product of claim 35, wherein the operations further comprise:
assigning by the master control module the database request to an alternative database server selected from the plurality of database servers, based upon a comparison of a first expected load on the assigned database server and a second expected load on the alternative database server.

42. The computer program product of claim 35, wherein the operations further comprise:
assigning by the master control module the database request to an alternative database server selected from the plurality of database servers based upon a failure in handling the database request by the assigned database server.

* * * * *

UNITED STATES PATENT AND TRADEMARK OFFICE
CERTIFICATE OF CORRECTION

| | | |
|---|---|---|
| PATENT NO. | : 7,065,526 B2 | |
| APPLICATION NO. | : 10/081525 | |
| DATED | : June 20, 2006 | |
| INVENTOR(S) | : Wissner et al. | |

It is certified that error appears in the above-identified patent and that said Letters Patent is hereby corrected as shown below:

Column 18, Claim 23, line 28, please change "farther" to --further--

Column 19, Claim 30, line 26, please remove "semicolon" after "that".

Column 20, Claim 39, line 38, please change "Location" to --location--

Signed and Sealed this

Fifth Day of December, 2006

JON W. DUDAS
*Director of the United States Patent and Trademark Office*